United States Patent [19]
Winzer

[11] 4,439,005
[45] Mar. 27, 1984

[54] BRANCHING ELEMENT FOR OPTICAL WAVEGUIDES

[75] Inventor: Gerhard Winzer, Munich, Fed. Rep. of Germany

[73] Assignee: Siemens Aktiengesellschaft, Berlin & Munich, Fed. Rep. of Germany

[21] Appl. No.: 66,695

[22] Filed: Aug. 15, 1979

[30] Foreign Application Priority Data

Sep. 18, 1978 [DE] Fed. Rep. of Germany ....... 2840602

[51] Int. Cl.³ .............................................. G02B 7/26
[52] U.S. Cl. ................... 350/96.15; 250/227; 350/96.20; 350/320
[58] Field of Search ............... 350/96.15, 96.16, 96.17, 350/96.20, 320; 250/227

[56] References Cited

U.S. PATENT DOCUMENTS

| | | | |
|---|---|---|---|
| 4,092,061 | 5/1978 | Stigliani, Jr. ..................... | 350/96.15 |
| 4,103,154 | 7/1978 | d'Auria et al. ..................... | 250/227 |
| 4,130,343 | 12/1978 | Miller et al. ..................... | 350/96.15 |
| 4,165,496 | 8/1979 | Di Domenico, Jr. et al. ... | 350/96.15 X |
| 4,173,390 | 11/1979 | Käch ............................... | 350/96.16 |
| 4,176,908 | 12/1979 | Wagner ........................... | 350/96.15 |

FOREIGN PATENT DOCUMENTS

| | | | |
|---|---|---|---|
| 2808002 | 8/1978 | Fed. Rep. of Germany ... | 350/96.15 |
| 2328973 | 5/1977 | France ............................. | 350/96.15 |

OTHER PUBLICATIONS

*American Heritage Dictionary*, Houghton Mifflin Co. (Boston), William Morris, Ed., 1976, p. 1323.
Bloem et al., "Fiber–Optic Coupler", *IBM Tech. Discl. Bull.*, vol. 16, No. 1, Jun. 1973, pp. 146–147.
Kuwahara et al., "A Semi–Transparent Mirror-Type . . .", *IEEE Trans. on Microwave Th. & Tech.*, Jan. 1975, pp. 179–180.
Mahlein et al., "An Integrated Optical TE-TM Mode Splitter", *Applied Physics*, vol. 7, No. 1, May 1975, pp. 15–20.
Kobayashi et al., "Micro–Optics Devices for Branching . . .", *Intl. Conf. of Int. Optics & Opt. Fiber Commun.*, 1977, paper B11-3, (pp. 367–370).

*Primary Examiner*—John D. Lee
*Attorney, Agent, or Firm*—Hill, Van Santen, Steadman & Simpson

[57] ABSTRACT

A branching device for branching a light component out of an optical waveguide characterized by a pair of carriers each supporting a waveguide, a supporting arrangement for supporting the carriers with the end surfaces of the waveguide spaced apart by a reflective layer of a beam divider sandwiched between the end surfaces and a detector arranged to receive the light coupled by the reflective layer from the waveguides. A method of forming the device preferably provides a common member having a waveguide, severing the member along a plane extending obliquely to the axis of the waveguide to form the two halves or carrier members, optically polishing the cut surfaces of the halves, applying a reflective layer of the beam divider on a polished cut surface of one of the carrier members. Then the carriers are formed into a waveguide unit with the polished, cut surfaces separated by the layer of the beam divider. The waveguide unit is then either assembled in a support carrier or directly positioned within a tubular sleeve member having an opening for the photo detector and the parts are arranged so that the light component will be received by the photo detector.

22 Claims, 2 Drawing Figures

BRANCHING ELEMENT FOR OPTICAL WAVEGUIDES

BACKGROUND OF THE INVENTION

The present invention is directed to a branching device or element for branching a light component out of an optical waveguide.

Optical communication systems require branching elements or devices which can couple out a component of light conducted in a light conducting fiber and supply this light to a photo detector. A branching element or device suitable for this purpose is disclosed by K. Kobayashi et al, 1977, *Inter. Conf. on Integrated Optics and Optical Fiber Communication*, Technical Digest, Papter B11-3. This device was constructed so that a light emerging out of an incoming fiber was directed into a group of parallel beams with a lens system. The group of parallel beams is then directed at a beam divider which splits the beams into parallel sub-groups of beams. Each of the sub-groups of beams is then received by a lens system which focus the sub-group into an outgoing fiber. This device or element is technically elaborate and required precise adjustment during production.

SUMMARY OF THE INVENTION

The present invention is directed to providing a branching device which enables coupling out a portion of a light to form a light component and which device can be produced easily without elaborate adjustment provisions.

To accomplish this object, the branching device comprises a pair of optical waveguides, each of the waveguides being received in a carrier member, means for positioning the carrier members with the optical axis of each of the pair of waveguides being on a common waveguide axis and a gap between the end surfaces thereof, a beam divider means being disposed between the end surfaces of the waveguides and including a layer extending obliquely to the common waveguide axis for reflecting out a portion of the light transmitted by one of the waveguides as a light component and a photo detector, said means for positioning the carrier members positioning the photo detector in a position to receive said light component.

Preferably, the end surfaces of the waveguide abut against the layer of the beam divider. This ensures minimum insertion losses.

The carrier member for each of the optical waveguides may be a cylindrical body in which the waveguide is secured in a bore extending parallel with the cylindrical axis. While the entire cylindrical body may be made of a transparent material, it must consist of a transparent material at least in the area of the end surface of the waveguide.

In a particularly advantageous embodiment, the beam divider means comprises a layer which extends over the cross section of the carrier and abuts against the entirety of one of the end surfaces of the carrier and its respective waveguide. The other waveguide and carrier member are positioned so that their end surfaces engage the layer which separates the two end surfaces of the pair of carriers and waveguides.

It is advantageous for the positioning means to include a support carrier which has an opening extending toward the photo detector. In particular, if the carrier for the waveguides is a cylindrical body, the support carrier preferably has a guide groove extending parallel to the common axis of the optical waveguides and the cylindrical bodies of the carrier members are received in the guide grooves to facilitate a particularly simple and self-adjusting production of the proposed unit.

In an advantageous embodiment of the waveguide unit such as the support carrier is secured in a sleeve or tubular member whose wall is provided with an opening at which the photo detector is secured. Preferably, the sleeve is a metal member.

Expediently, the sleeve member or tubular member at the ends opposite the beam divider means are provided with means forming a portion of part of a plug connection. This means forms a plug part which enables linking the optical waveguides of the device to other optical waveguides. Preferably, this means for forming a part consists of a standardized plug element and is preferably a metallic guide bearing or sleeve which is attached by means of an adhesive to the tubular member and is coaxially adjusted to the waveguides.

A particularly advantageous process or method for producing the branching device comprises providing an elongated member supporting an optical waveguide extending along the length of said member; cutting the elongated member into two halves by a cut directed obliquely to the axis of the waveguides; processing the cut surfaces of the two halves to optical quality; applying a layer of the beam divider means on one of the cut surfaces; positioning the two halves with the surfaces engaged with each other and the waveguides on a common waveguide axis; securing the two halves together to form a waveguide unit; providing a tubular member having an opening and forming a part of the positioning means; positioning the waveguide unit in the tubular member with the light component being reflected at said opening; and securing the photo detector on the tubular member at the opening. While positioning the two halves, they may be placed on an adjustment surface provided with a laterally extending stop element or abutment surface, then the halves may be adjusted so that the cut surfaces extend parallel and abut with the reflective layer therebetween prior to joining the members into the waveguide unit. The adjustment surface and abutment surfaces may be a groove in a support carrier which is secured in the unit.

The elongated member may be a cylindrical member such as a capillary tube having a bore receiving the waveguide to form the cylindrical carrier members. The elongated member may also be a silicon body which has a surface with a guide groove anisotropically etched therein, the waveguide placed in the anisotropically etched groove and a transparent cover plate secured on said surface.

When applying the layer of the beam divider means on one of the processed cut surfaces, the layer may be vapor deposited with the material being selected from a group consisting of metal and dielectric materials. Preferably, the step of positioning the waveguide unit in the tubular member is accomplished prior to securing the photo detector at the opening. In addition, it is desired that the waveguide unit be positioned in a support carrier which is subsequently positioned in the tubular member. The support carrier preferably is provided with a groove which extends on the common axis. The support carrier with the waveguide unit is then inserted into the tubular member or sleeve member with the beam divider means being positioned to reflect light through the opening if the photo detector has not been inserted or secured thereat. In the event the photo detector has already been secured in the opening, the carrier is positioned until a maximum reading is obtained from the detector.

Preferably, after securing the waveguide unit in the tubular member, the tubular member is provided with sleeve or bearing members at each end which bearing members are secured on the tubular member after being coaxially aligned with the common axis of the waveguides.

The proposed branching device is characterized by its low insertion losses which are below 2 dB. In addition, its compact construction can be achieved using extremely simple technology with the adjustments being simply achieved.

DESCRIPTION OF THE PREFERRED EMBODIMENTS

Figure 1:
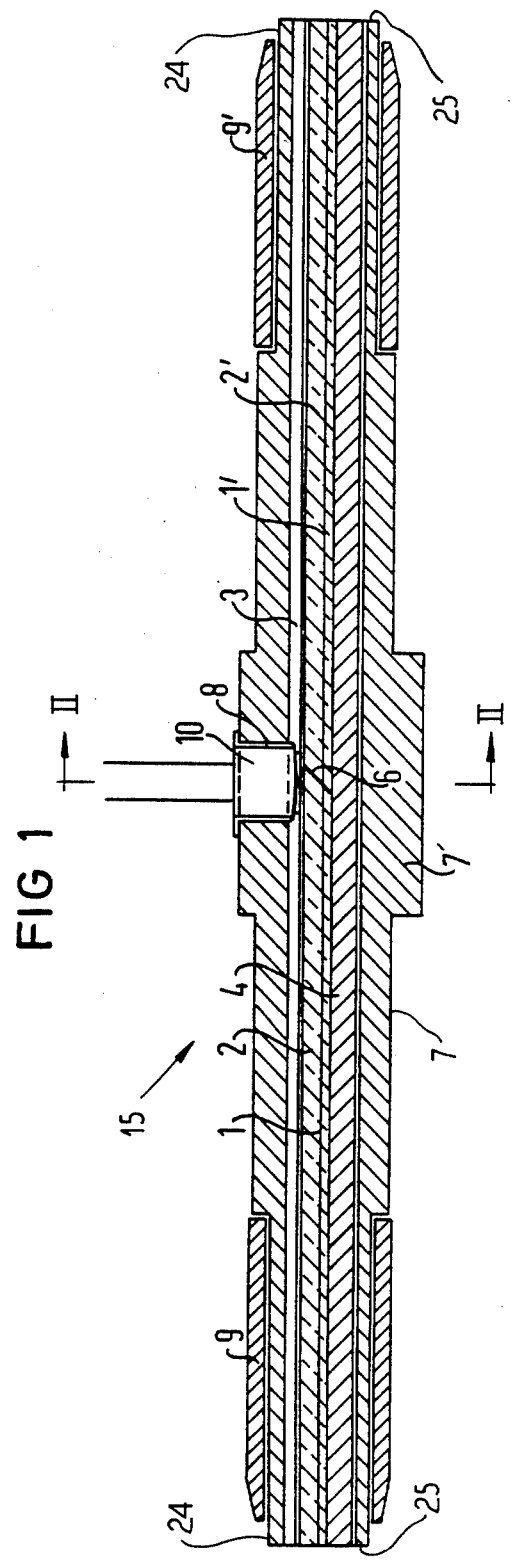
FIG. 1 is a longitudinal cross section with portions in elevation for purposes of illustration of a branching device in accordance with the present invention.
Figure 2:
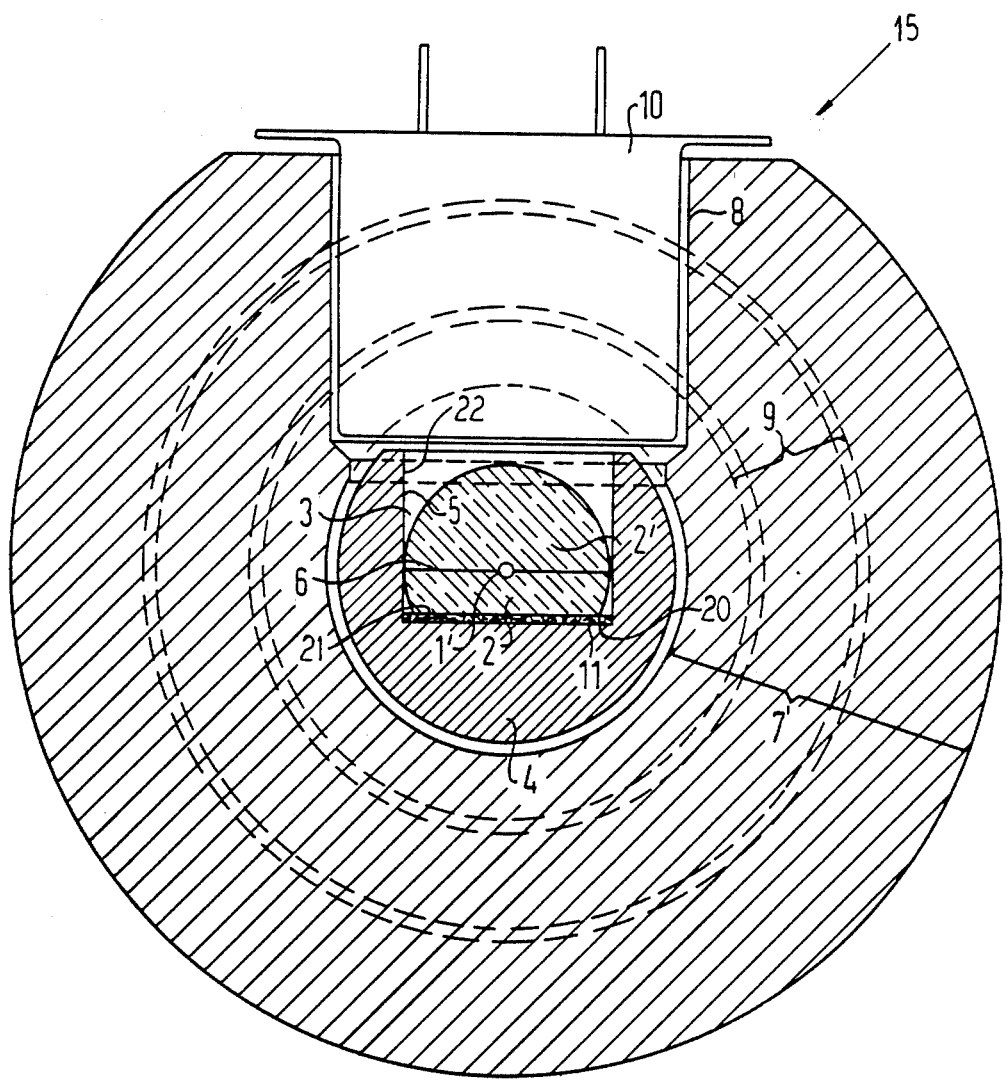
FIG. 2 is a cross section of the device with portions in elevation taken along lines II—II of FIG. 1.

The principles of the present invention are particularly useful in a branching device generally indicated at 15 in FIGS. 1 and 2. As illustrated, the branching device has two coaxially aligned light conducting fibers 1 and 1' which form the waveguides of the device and whose axes are on a common waveguide axis. The waveguides 1 and 1' are spaced apart by a small gap, which has the dimensions of a layer 6, which forms a portion of a beam divider means for reflecting light out of the waveguides, such as 1, as the light component. Each of the light conducting fibers 1 and 1' is arranged and secured in an opening or bore of a cylindrical glass capillary 2 and 2', respectively. The light conducting fibers extend parallel to the cylindrical axis of each of the capillary tubes 2 and 2'.

The beam divider means, which is formed by a layer 6, preferably extends over the cross section of the carriers 2 and 2'. Preferably, the layer 6 is applied to one of the end surfaces of the carriers 2 and 2' and the carriers 2 and 2' are arranged with the end surfaces abutting against the layer 6.

The two capillary tubes which form the carriers 2 and 2' are received in a groove 5 (FIG. 2) of a cylindrical support carrier 4 and are secured therein. As can be seen in FIG. 2, the carriers 2 and 2' have a circular, cylindrical shape on which a flat surface 20, that extends parallel to the axis of the waveguides, has been produced by grinding and polishing. The opening or bore of the capillary tubes extends along the axis of the original circular cylinder. The support carrier 4 also consists of a cylindrical cylinder into which the longitudinal groove 5 has been formed with a rectangular cross section having a flat bottom surface 21 and side surfaces 22. The flat surface 20 of the capillary tube is joined by an adhesive 11 to the base or bottom surface 21 of the groove 5 so that the capillary tube is connected to the support carrier 4.

Before securing the carriers 2 and 2' in the carrier 4, the base surface 21 of the groove 5 is preferably provided with an optical absorbing material whih can also be applied to the side walls 22 of the groove. It is expedient to use an adhesive 11 which simultaneously possesses the requisite absorption properties.

The support carrier 4 and the capillary tubes 2 and 2' secured therein is then inserted into a metal tubular member or sleeve 7 having a circular cross section whose wall is provided with an opening 8 for receiving the photo detector 10. As illustrated, the opening 8 is formed in a portion 7' of the member 7 which portion 7' has an increased thickness. Before the support carrier 4 is secured in the metal sleeve 7, its position is adjusted so that the light component from one of the waveguides 1 and 1', which is reflected by the beam divider means, falls onto the inlet window of the photo detector 10.

The adjustment of the support carrier 4 in the metal sleeve member 7 can be carried out particularly easily, if the beam divider reflector is inclined at an angle of 45° to the common axis of the waveguides 1 and 1'. Then it is only necessary to arrange the center of the light inlet window of the photo detector 10 to extend on an axis which is perpendicular to the common axis and intersects the common axis in the plane of the layer 6. Since the center of the light inlet window of the detector 10 generally coincides with the center of the opening 8, the support carrier 4 can be adjusted before the detector 10 is secured in the opening 8. However, if the detector 10 is already secured in the opening 8, the adjustment can be obtained by displacing and rotating the support carrier 4 until the detector displays the maximum current.

The support carrier 4 is preferably cemented in the sleeve or tubular member 7, and at least in the region of the opening 8, it is necessary to use an optical transparent cement. The photo detector 10, which can consist of a photo diode, is also cemented into position which can be carried out simultaneously to the cementing of the support carrier. After securing the support carrier 4 in the member 7, standard size metal guide bearings or sleeves 9 and 9', which form the prong of a plug connection are attached by adhesive to the ends 24 of the tubular member 7 which ends have a reduced diameter. Prior to the hardening of the adhesive, the sleeves 9 and 9' are coaxially adjusted to the common axis of the waveguides 1 and 1'. The end surface 25 of the two prong connectors of the branching device 15 are normally plane polished perpendicular to the common axis of the fibers forming the waveguides 1 and 1'. Thus, as illustrated in FIG. 1, the tubular member 7 and the support carrier 4 with the carrier members 2 and 2' and the waveguides 1 and 1' have approximately the same length.

The two capillary halves 2 and 2' with the fibers 1 and 1' are expediently produced from a starting capillary tube of the circular cross section having a central opening in which the fiber is inserted and secured by optical cement. If a synthetic casing is provided on the fiber, it is removed in the central area of the fiber prior to the cementing operation. The capillary tube has a flat, longitudinal surface 20 extending parallel to the common axis. This surface 20 can be formed in the tube prior to attaching the waveguide or subsequent thereto. The capillary tube prepaed in this way is then cut into two halves by a cut extending at an angle of 45° to the cylindrical axis. The two cut surfaces are then optically polished so that the two capillary halves 2 and 2' are produced in this way.

One of the two polished cut surfaces is provided with a metallic or dielectric coating which forms the layer 6 of the beam divider means. The advantage of a metallic beam divider layer is that it can be produced by simple technology and nevertheless fulfills the requirement for which branching is subjected.

The two capillary halves 2 and 2', which have been produced in this way, are then positioned on a surface of an adjusting body provided with a stop means so that the flat surface 20 rests on the surface of the adjusting body and the two capillary halves abut laterally against the stop means, then the cut surfaces and the beam divider reflecting layer are automatically arranged parallel to one another. With the halves engaging the stop means, the two halves are displaced to bring the cut surfaces together and into engagement with the layer 6. Then the halves are joined together by an optical cement to form the waveguide unit. In the present, illustrated embodiment, the support carrier 4 can be advantageously used as the adjusting body with the base or bottom 21 of the groove being the adjustment surface and one of the side walls 22 of the groove 5 forming the abutment means or surface.

Instead of using a glass capillary tube as a carrier 2 and 2' for the optical waveguides 1 and 1', it is also possible to use a silicon substrate provided with a guide groove in one surface. The optical waveguide is inserted in the guide groove whereupon the surface of the substrate is provided with a transparent cover which is secured thereto.

The guide groove of the silicon substrate can be produced by a method of preferred etching or anisotropic etching. The silicon substrate with a waveguide in the groove and covered by the transparent cover member which is cemented to the surface is an integral starting body or member. A cut directed at an angle of 45° to the axis of the optical waveguide and at right angles to a surface normal to the first mentioned substrate surface serves to split the starting body into two parts. The cut surfaces are then polished. One of the cut surfaces is provided with a layer of the beam divider means and the two carrier halves are then assembled in such a way that the fibers are on a common axis and the ends of the carrier have the layer of the beam divider means sandwiched therebetween.

Although various minor modifications may be suggested by those versed in the art, it should be understood that I wish to embody within the scope of the patent granted hereon, all such modifications as reasonably and properly come within the scope of my contribution to the art.

I claim:

1. A branching device for branching a light component out of an optical waveguide extending on a common waveguide axis, said device comprising a pair of optical waveguides; each of the waveguides being received in a carrier member, each carrier member being a body having a substantially cylindrical shape; means for positioning the carrier members with the optical axis of each of the pair of waveguides being on the common waveguide axis and a gap between the end surfaces thereof; a beam divider means being disposed in the gap between the end surfaces of the waveguides and including a layer extending obliquely to the common waveguide axis for reflecting out a portion of the light transmitted by one of said waveguides as a light component on a path; and a photo detector, said means for positioning including a tubular member having an aperture for receiving and positioning the photo detector and a support carrier having a cylindrical shape and having a longitudinally extending groove receiving the pair of carrier members with the layer arranged to reflect the light component out of the groove, said support carrier being received in the tubular member with the groove and light waveguides being on the common axis and the path of the light component being directed at the photo detector, and said support carrier with the carrier members and the tubular member having approximately the same lengths so that the ends of the device are plane surfaces.

2. A branching device according to claim 1, wherein the end surfaces of each of the waveguides abut against the layer of the beam divider means.

3. A branching device according to claim 2, wherein each of the cylindrical bodies is formed of a transparent material at least in the portion adjacent the end surface of the optical waveguide.

4. A branching device according to claim 3, wherein each of the carrier members is formed by a glass capillary tube having a bore in which the waveguide is secured.

5. A branching device according to claim 1, wherein each of the carrier members is formed by a body composed of silicon having a surface with a guide groove provided therein for receiving the waveguide and a transparent cover member secured to said surface to close off the groove with the waveguide therein.

6. A branching device according to claim 5, wherein the guide groove is an anisotropically etched groove.

7. A branching device according to claim 1, wherein the optical waveguide is a glass fiber.

8. A branching device according to claim 7, wherein the glass fiber has an index of refraction profile selected from a group of profiles consisting of stepped and gradient profiles.

9. A branching device according to claim 1, wherein the waveguide is a multi-mode waveguide.

10. A branching device according to claim 1, wherein the layer of the beam divider means extends over the entire end surface of one of the carrier members and contacts the end surfaces of both members.

11. A branching device according to claim 1, wherein said tubular member is a metal sleeve.

12. A branching device according to claim 1, wherein said tubular member adjacent its ends has means forming half of a plug connection for linking the optical waveguides of the device to other optical waveguides.

13. A branching device according to claim 12, wherein said half of the plug connection comprises a metallic guide sleeve being fixed by an adhesive on the tubular member and being coaxially adjusted with the common axis of the waveguides.

14. A branching device according to claim 1, wherein the layer of the beam divider means comprises a layer of material selected from a group consisting of metallic and dielectric material.

15. A method for producing a branching device having a pair of optical waveguides received in carrier members, means for positioning the carrier members with the optical axis of the pair of waveguides being on a common waveguide axis and a gap between the end surfaces thereof, a beam divider means disposed between the end faces of the waveguides and including a layer extending obliquely to the common axis for reflecting out a portion of the light transmitted by one of said waveguides as a light component, and a photo detector positioned to receive the light component, said method comprising providing an elongated member supporting an optical waveguide extending along the length of said member; cutting the elongated member into two halves by a cut directed obliquely to the axis of the waveguide; processing the cut surfaces of the two halves to optical quality; applying the layer of the beam divider means on one of the cut surfaces; positioning the two halves in a groove of a cylindrical support carrier of the positioning means with the other cut surface engaged with the layer and with the layer reflecting the component from the groove and with the waveguides on a common waveguide axis; securing the two halves and the support carrier together to form a waveguide unit; providing a tubular member having an opening and forming another part of the positioning means; positioning and securing the waveguide unit in the tubular member with the light component being reflected at said opening; and securing the photo detector on the tubular member at the opening.

16. A method according to claim 15, wherein the step of applying the layer comprises vapor depositing the layer of material onto a cut surface, said layer of material being selected from a group consisting of metal and dielectric materials.

17. A method according to claim 15, wherein the step of positioning the waveguide unit in the tubular member is accomplished prior to securing the photo detector at the opening.

18. A method according to claim 15, wherein the step of providing an elongated member provides a cylindrical starting body having an axially extending bore with an optical waveguide secured therein.

19. A method according to claim 15, wherein the step of providing an elongated member provides a silicon substate, anisotropially etching a groove in a surface of the substrate, placing an optical waveguide in said etched groove, securing a transparent plate on said surface to enclose said waveguide.

20. A process according to claim 15, which further includes securing a guide bearing sleeve on each end of the tubular member in coaxial alignment with the optical waveguide to form a part of a plug connection.

21. A method according to claim 20, which includes plane polishing each of the ends of the device to extend perpendicular to the common axis so that the waveguide unit and the tubular member have approximately the same length.

22. A method according to claim 15, wherein the groove has a flat surface with a lateral abutment face and the step of positioning the halves includes placing the halves on the flat surface, moving each of the halves to engage the abutment face and then moving the halves to bring the other cut surface into engagement with the layer.

* * * * *